Aug. 28, 1956     R. F. SMITH     2,760,326
CUTTER AND CONVEYING ATTACHMENT FOR TRACTORS
Filed March 30, 1953     2 Sheets-Sheet 1
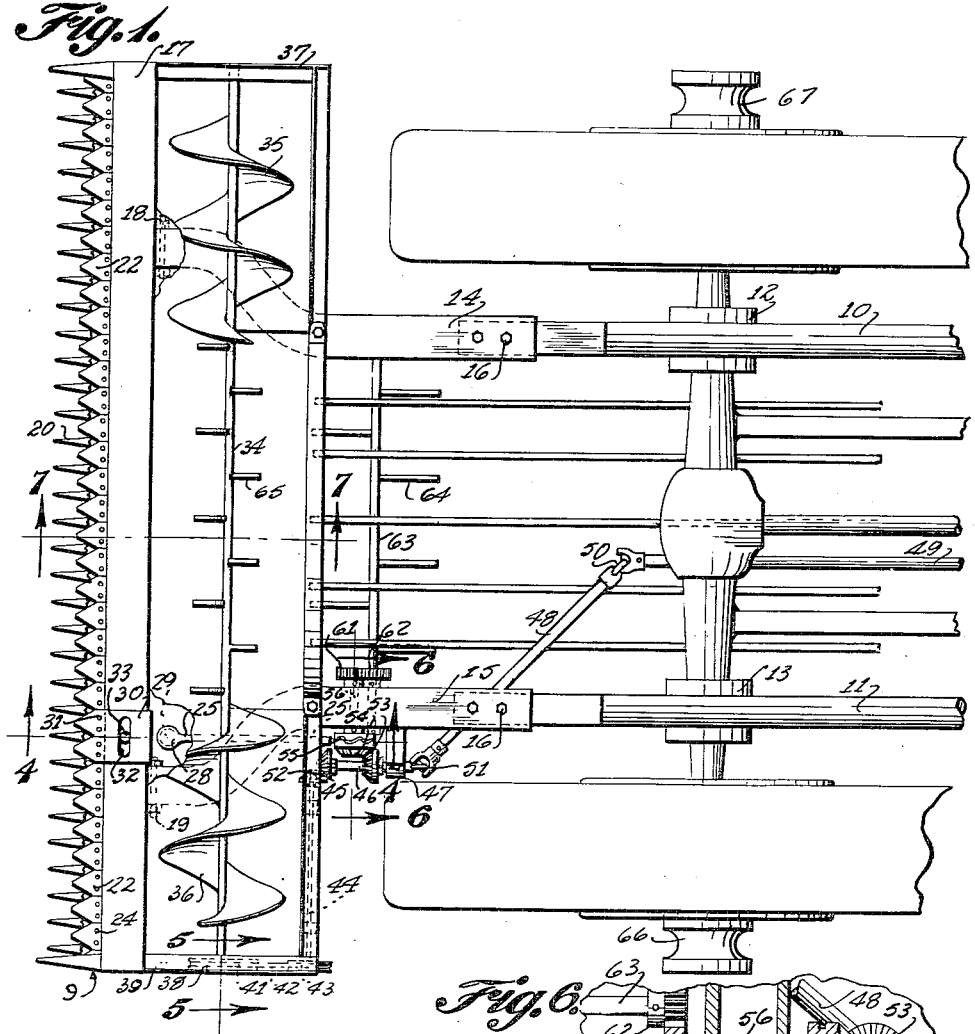
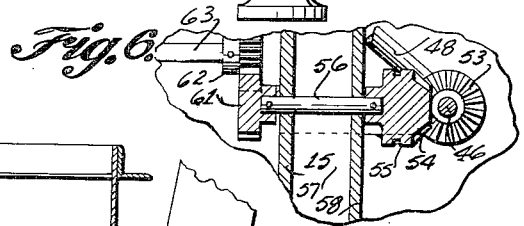
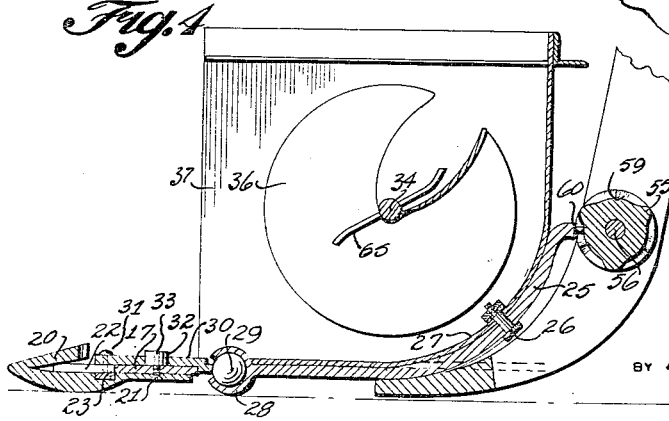
INVENTOR.
Roy F. Smith.
BY Victor J. Evans & Co.
ATTORNEYS

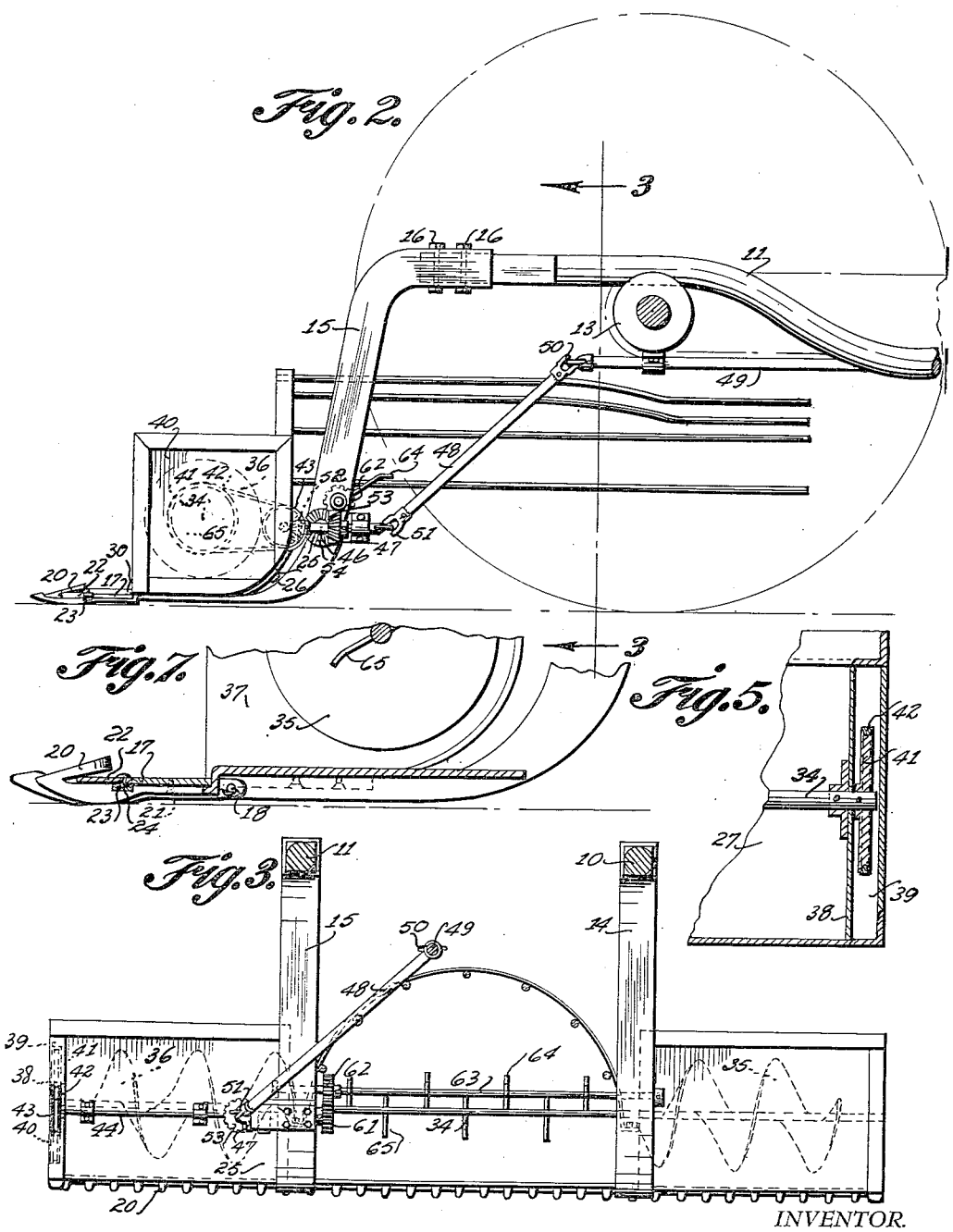

United States Patent Office 2,760,326
Patented Aug. 28, 1956

2,760,326

CUTTER AND CONVEYING ATTACHMENT FOR TRACTORS

Roy F. Smith, Silt, Colo.

Application March 30, 1953, Serial No. 345,544

1 Claim. (Cl. 56—23)

This invention relates to devices for mounting implements and particularly cutter bars, and the like on tractors and the like, and in particular spaced parallel bars adapted to extend rearwardly from a vehicle, such as a tractor with the beams supported by the rear axle housing of the tractor and with the forward ends of the beams vertically supported with hydraulic jacks or cylinders mounted on the chassis or frame of a tractor or other vehicle.

This invention discloses an application of the connecting bars or my draw bar application filed herewith wherein the inner ends of the connecting bars are vertically adjusted with hydraulic cylinders or jacks, to a mowing machine attachment or cutter bar, the mowing machine attachment being suspended from extended ends of the connecting bars.

Various types of attachments have been provided for mounting mowing machine attachments or cutter bars on tractors and the like, however, it has been found difficult to provide a floating mounting for a cutter bar with means for reciprocating the blades and at the same time feeding cut material into a windrow formed at the center of the machine.

The object of this invention is, therefore, to provide a mounting adapted to attach the cutter bar of a mowing machine, or the like to a tractor or the like wherein an implement carried by the mounting is readily adjustable vertically and wherein operating elements thereof are actuated by power means of the tractor.

Another object of the invention is to provide mounting elements particularly adapted for attaching a cutter bar of a mowing machine or the like to a tractor or the like that is adapted to be installed on a tractor without changing parts thereof.

A further object of the invention is to provide an implement mounting for tractors and the like in which the mounting is of a comparatively simple and economical construction.

With these and other objects and advantages in view the invention embodies a pair of beams carried by an axle of a vehicle with means for attaching a cutter blade of a mowing machine on extended ends thereof and with means for operating the cutter blade or other operating elements from the power take off of a tractor or the like upon which the device is positioned.

Other features and advantages of the invention will appear from the following description taken in connection with the drawings, wherein:

Figure 1 is a plan view illustrating the improved implement mounting and showing the cutter bar of a mowing machine carried by extended ends of side beams of the mounting.

Figure 2 is a side elevational view of the mower attachment showing the attachment in combination with the rear axle of a tractor and with the wheel on the near side of the tractor omitted to show the connection of the cutter bar to the beams of the mounting, the rear axle of the tractor being shown in section.

Figure 3 is a cross section taken on line 3—3 of Figure 2 illustrating the mower attachment.

Figure 4 is a cross section through the mower attachment, taken on line 4—4 of Figure 1, illustrating the cam and pitman or rocker arm movement for reciprocating the cutter bar, the parts being shown on an enlarged scale.

Figure 5 is an enlarged detail showing a section taken on line 5—5 of Figure 1, illustrating the mounting of the conveyor shaft and driving pulley therefor.

Figure 6 is an enlarged detail, also with the parts shown on an enlarged scale taken on line 6—6 of Figure 1, showing the driving connection of the cutter bar operating cam to the power take-off of a tractor.

Figure 7 is an enlarged detail showing a section taken on line 7—7 of Figure 1, illustrating the construction of the cutter bar.

Referring now to the drawings wherein like reference characters denote corresponding parts the improved implement mounting of this invention includes spaced side bars or beams 10 and 11 positioned on collars 12 and 13, respectively, and brackets 14 and 15, secured to the ends of the bars with bolts 16, and providing supporting means for the cutter bar 9 of a mowing attachment, the mounting bar 17 of which is secured to the lower ends of the brackets with bolts 18 and 19.

The opposite ends of the side bars 10 and 11 are carried by vertically positioned hydraulic cylinders (not shown) which are adapted to be mounted on the chassis of a tractor, and by this means a floating mounting is provided whereby a cutter bar of a mower attachment, or other implement or device may be adjustably supported on the rear axle, or other part of a tractor.

In this application a mowing attachment is shown as carried by the extended ends of the side bars of the mounting. Spaced guards 20 are secured to the bar 17 with screws 21 and knives 22 are bolted to a sickle bar 23 with bolts 24. The knives are actuated by a rocker arm or lever 25 which is pivotally mounted by a bolt 26 on a plate or wall member 27 and the extended end of the lever is provided with a socket 28 that is positioned over a ball 29 which may be secured as by welding to a plate 30 that is slidably mounted on the plate 17, and that is connected to the bar 23 with bolts 31 which extend through knives of the cutter bar.

The plate 30 is provided with a slot 32 through which a stud 33 on the bar 17 extends, as shown in Figures 1 and 4.

The plate or wall member 27 provides a back and bottom of a housing for conveying elements of the attachment, and as shown in Figure 5, a continuous conveyor shaft 34, having oppositely positioned screw conveyor elements 35 and 36 thereon, is journaled in end plates 37 and 38 of the housing. One end of the housing is provided with an extended section 39 having an end wall 40, and a pulley 41, carried by the end of the shaft 34 and positioned in the section 39 receives a belt 42 that is also trained over a pulley 43 on a shaft 44. The shaft 44, which is journaled on the housing, is driven by a bevel gear 45 on a shaft 46 that is journaled in a bearing 47 on one side of the bracket 15, and the shaft 46 is driven from the power take-off (not shown) of a tractor to which the mounting is connected by shafts 48 and 49, the shafts being connected with universal joints 50 and 51. The shaft 44 is provided with a bevel gear 52 that meshes with the gear 45 on the shaft 46.

The shaft 46 is also provided with a bevel gear 53 that meshes with a gear 54 on one end of a cam 55 on a stub shaft 56 that is journaled in side plates 57 and 58 of the bracket 15, as shown in Figure 6. The cam 55 is provided with a cam groove 59 into which a pin 60 on the end of the rocker arm 25 extends whereby the knives of the cutter bar are reciprocated by the cam.

The shaft 56 is also provided with a gear 61 that meshes with a gear 62 on a shaft 63 that is journaled in the brackets 14 and 15 and the shaft 63 is provided with spaced staggered tines 64 that are positioned to feed products from the screw conveyors to a windrow positioned in the center of the machine.

The shaft 34 on which the oppositely disposed screw conveyor elements are positioned is also provided with tines 65 that also feed products from the cutter bar into the centrally positioned windrow.

As illustrated in Figure 1, additional collars 66 and 67 may be bolted to the sides of the wheels of a tractor on which the mounting is installed so that the side bars 10 and 11 may be placed outside of the wheels. This makes it possible to extend the width of implements, such as the cutter bars, and also provides additional supporting elements at the sides of a machine. These collars 66 and 67 may or may not be used as desired.

With the attachment mounted on the rear of a tractor such as a tractor of the reversible type, wherein the tractor travels in reverse, eliminates the wheels of the tractor running over uncut grain, hay, and the like preventing waste of products in harvesting.

The mounting eliminates side draft and also a portion of the wear and strain on the machine.

With this type mower you can cut back and forth across a field and in substantially any direction desired.

It will be understood that other modifications, within the scope of the appended claim, may be made in the design and construction of the parts without departing from the spirit of the invention.

What is claimed is:

A cutter and conveying attachment for a tractor, comprising a horizontally disposed mounting bar, a pair of brackets having their lower ends secured to said mounting bar, a plurality of spaced guards secured to said mounting bar, said mounting bar forming a part of a cutter bar, a sickle bar arranged contiguous to said guards, a plurality of knives secured to said sickle bar, a plate slidably connected to said mounting bar, a ball secured to the rear end of said plate, a lever provided with a socket for rotatably engaging said ball, a housing including a wall member having said lever pivotally connected thereto, said plate being provided with a slot, a stud extending from said mounting bar and projecting through said slot, said housing including spaced parallel vertically disposed end plates, a horizontally disposed conveyor shaft journaled in said end plates, a pair of oppositely positioned screw conveyor elements on said shaft, said screw conveyor elements having their inner ends spaced from each other, a plurality of staggered tines mounted on said shaft and interposed between said pair of screw conveyor elements, an extended section on an end of said housing and said extended section having an end wall, a pulley positioned in said extended section and arranged on an end of said shaft, means connecting said pulley to a tractor power take-off, and a shaft arranged rearwardly of said housing and said last named shaft being provided with a plurality of staggered tines for feeding the products from the screw conveyor elements to a windrow positioned in the center of the attachment.

References Cited in the file of this patent

UNITED STATES PATENTS

| | | |
|---|---|---|
| 1,590,498 | Counts | June 29, 1926 |
| 1,932,717 | Wickersham | Oct. 31, 1933 |
| 2,247,680 | Graham | July 1, 1941 |
| 2,330,586 | Hurlimann | Sept. 28, 1943 |
| 2,472,762 | Sage | June 7, 1949 |
| 2,484,981 | Coultas | Oct. 18, 1949 |
| 2,487,144 | Kriedeman | Nov. 8, 1949 |
| 2,510,245 | Munter | June 6, 1950 |
| 2,513,703 | Annis | July 4, 1950 |
| 2,519,659 | Jahde | Aug. 22, 1950 |
| 2,547,438 | Burkholder | Apr. 3, 1951 |
| 2,638,728 | Balzer et al. | May 19, 1953 |
| 2,652,675 | Hughes et al. | Sept. 22, 1953 |

FOREIGN PATENTS

| | | |
|---|---|---|
| 9,768 | Australia | Oct. 10, 1928 |
| 482,913 | Canada | Apr. 29, 1952 |